United States Patent [19]

Miller

[11] Patent Number: 4,747,903
[45] Date of Patent: May 31, 1988

[54] GAS FIRED PLASTIC FILM SEAMING APPARATUS

[76] Inventor: Alvin L. Miller, 14949 Stanwood St. SW., Dalton, Ohio 44618

[21] Appl. No.: 905,301

[22] Filed: Sep. 9, 1986

[51] Int. Cl.⁴ .............................................. B32B 31/26
[52] U.S. Cl. .................................... 156/366; 156/368; 156/497; 156/499
[58] Field of Search ................. 156/497, 499, 82, 366, 156/359, 368

[56] References Cited

U.S. PATENT DOCUMENTS

| | | | |
|---|---|---|---|
| 3,097,986 | 7/1963 | Kaver | 156/497 |
| 3,402,089 | 9/1968 | Seaman | 156/497 X |
| 4,087,309 | 5/1978 | Lang | 156/499 X |
| 4,097,326 | 6/1978 | Giulie et al. | 156/366 |
| 4,239,581 | 12/1980 | Lang | 156/497 |
| 4,259,142 | 3/1981 | Kortepeter | 156/499 X |
| 4,447,208 | 5/1984 | Seaman | 156/499 X |
| 4,533,423 | 8/1985 | Johnson et al. | 156/499 X |

Primary Examiner—David Simmons
Attorney, Agent, or Firm—Fleit, Jacobson, Cohn & Price

[57] ABSTRACT

A plastic film seaming apparatus in the form of a gas fired rotary plastic film welding device for joining the edges of plastic film by applying heat and pressure to overlapped edges of plastic films with the heat and pressure being applied to the plastic film by a rotatably driven pressure roller system and heat being applied to the plastic film by a gas burner assembly so that the apparatus can be quickly and easily set up for use by connection with a suitable source of electrical energy and a suitable source of combustible gas.

6 Claims, 2 Drawing Sheets

GAS FIRED PLASTIC FILM SEAMING APPARATUS

BACKGROUND OF THE INVENTION

1. Field of the Invention

The present invention generally relates to a plastic film seaming apparatus and more particularly to a gas fired rotary plastic film welding device for joining the edges of plastic film by applying heat and pressure to overlapped edges of plastic films with the heat and pressure being applied to the plastic film by a rotatably driven pressure roller system and heat being applied to the plastic film by a gas burner assembly so that the apparatus can be quickly and easily set up for use by connection with a suitable source of electrical energy and a suitable source of combustible gas.

2. Information Disclosure Statement

Plastic film welding, sealing or seaming devices are generally known for securing thermoplastic materials together by applying heat and pressure. When joining overlapped edges of plastic film, it is sometimes difficult to obtain a uniform seal or weld and difficult to maintain proper orientation and alignment of the overlapped edges.

SUMMARY OF THE INVENTION

An object of the present invention is to provide a plastic film seaming apparatus for connecting overlapped edge portions of thermoplastic film such as vinyl film which is in the form of large panels in which the apparatus is gas fired with the gas flame being at high temperature thereby allowing the surface of the material to be heated to a sealing temperature with less penetration into the material therefore resulting in less distortion.

Another object of the invention is to provide a plastic film seaming apparatus in accordance with the preceding object in which the open gas flame used for heating the surface of the film requires oxygen to burn thereby creating a substantially inert atmosphere thus prohibiting or reducing the tendency of the material being seamed from burning and producing undesirable smoke and gases.

A further object of the invetion is to provide a gas fired rotary welder for seaming two pieces of plastic film which is quite efficient in operation since heating energy is used only during the actual sealing or seaming operation with the gas fired arrangement providing an instant on and instant off operation with no warm-up or cool-down cycles thus increasing the efficiency of the machine.

Still another object of the invention is to provide a plastic film seaming apparatus in which greater welding or seaming speeds can be achieved with the higher temperature produced by the gas flame used to heat the surface of the plastic film being joined with the higher temperature also enabling the sealing or seaming of plastic materials that heretofore have not been possible to seam in this manner.

A still further object of the present invention is to provide a gas fired plastic seaming apparatus operated by a foot control which applies power to a drive motor through an adjustable delay relay which opens the gas flow valve and turns on a gas igniter with the delay relay permitting the flame to be established before the drive assembly is put in motion to insure a uniform seal from the initiation of the sealing cycle with a braking relay also being provided to immediately stop the drive assembly to avoid any coasting action thereby producing a highly accurate and efficient sealing or seaming apparatus for plastic film.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
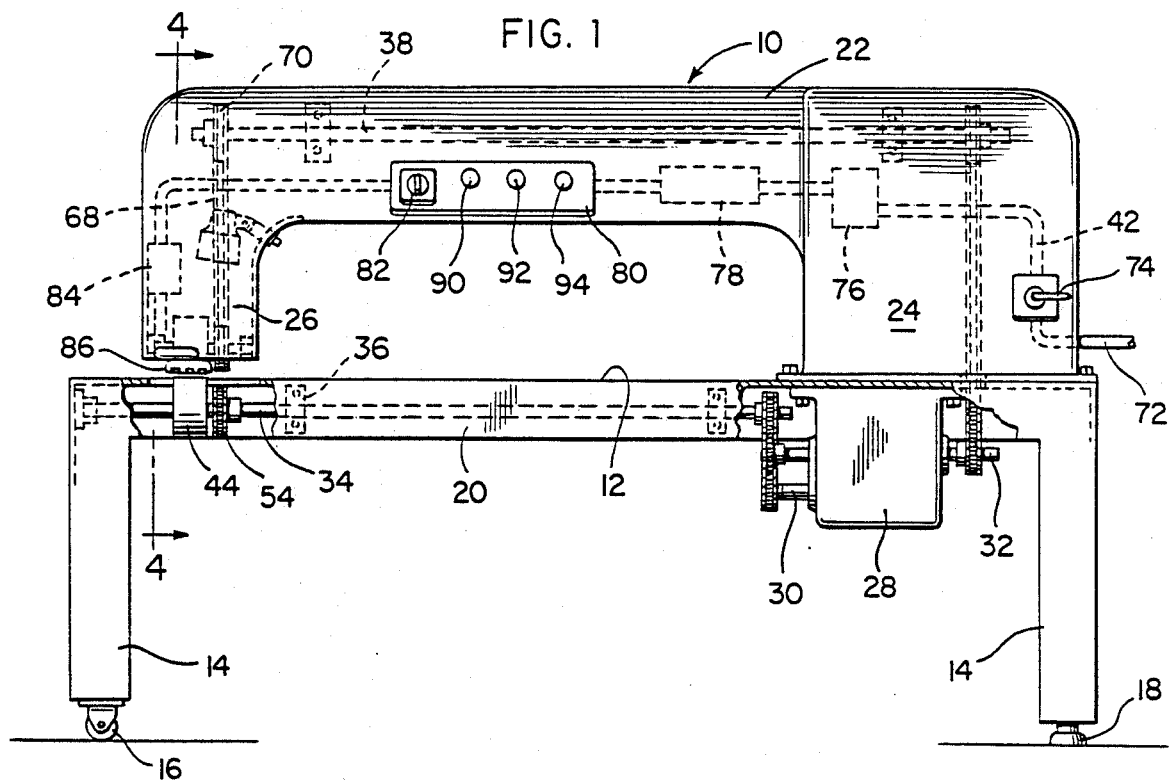
FIG. 1 is a side elevational view of the seaming apparatus for plastic film of the present invention.
Figure 2:
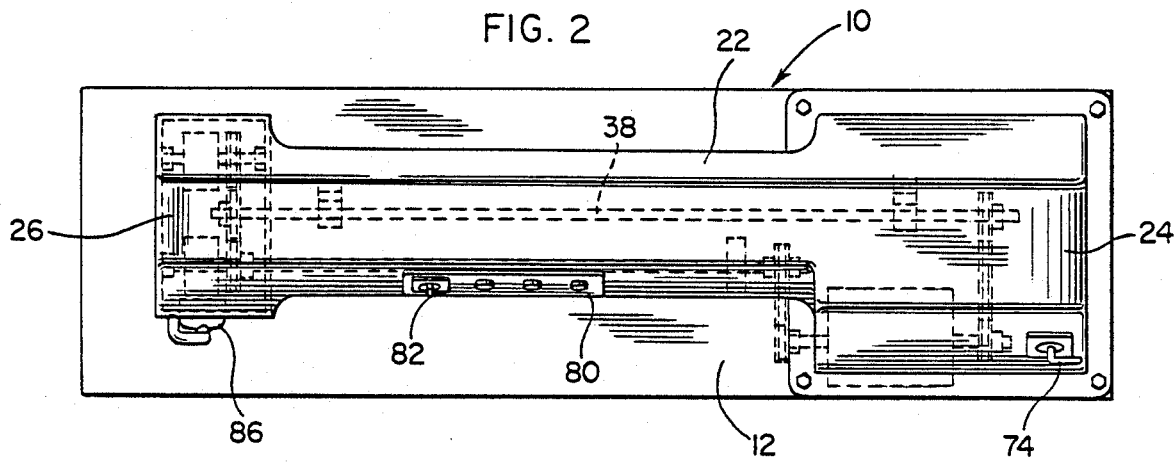
FIG. 2 is a top plan view of the apparatus.
Figure 3:
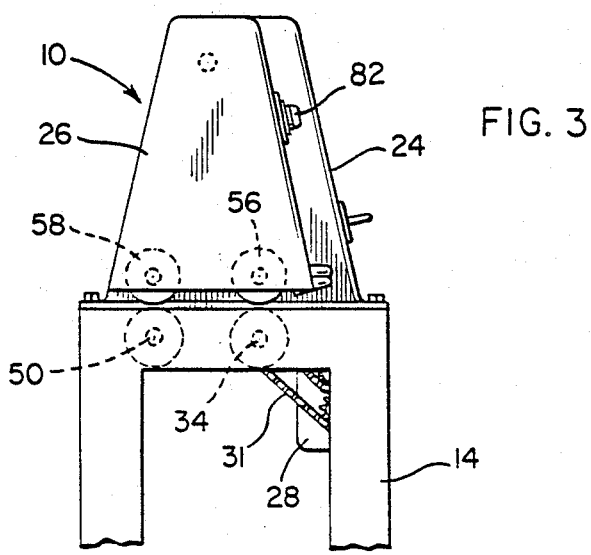
FIG. 3 is an end view of the apparatus.

Referring now specifically to the drawings, the gas fired plastic film seaming apparatus of the present invention is generally designated by reference numeral 10 and includes an elongated, generally rectangular supporting surface 12 in the form of a table or the like having depending support legs 14 at the corners with two of the legs being provided with supporting wheels or rollers 16 and the other legs provided with adjustable supporting members 18 to enable the apparatus to be moved to a desired site for use. As illustrated, the support surface 12 is generally planar and provided with depending edge flanges 20. Mounted on the surface of the supporting structure 12 is an elongated housing which is generally of inverted U-shaped construction as illustrated in FIG. 1 and includes upwardly tapering sidewalls as illustrated in FIG. 3 with the two ends of the housing depending toward the support surface 12 with one end 24 of the housing being supported rigidly at one end of the support 12 and the other end of the housing designated by numeral 26 terminates in spaced relation to the other end of the support surface 12 so that plastic film to be welded together can move between the support surface 12 and the lower end of the depending end 26 of the housing 22 with the film being unwound from supply spools or rolls or from any other source.

Figure 4:
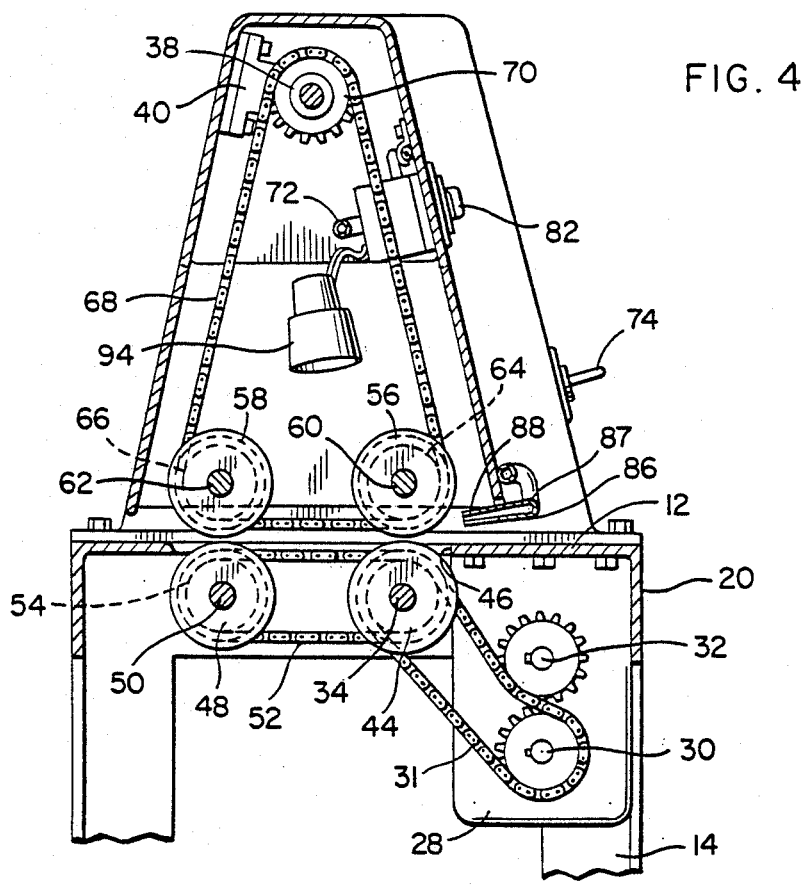
FIG. 4 is a transverse, sectional view taken substantially upon a plane passing along section line 4—4 on FIG. 1 illustrating the structural details of the drive assembly.

A drive motor 28 is supported in depending relation to the support surface 12 in generally underlying relation to the end 24 of the housing 22. The motor 28 is a gear head motor and includes an output shaft 30 which is drivingly connected to a primary drive shaft 32 journalled by suitable bearings or the like in generally parallel relation to the motor 28 and extending beyond both ends of the motor as illustrated in FIG. 1. The output shaft 30 also drives a lower drive shaft 34 which is journalled below the support surface 12 by suitable bearing structures 36. The primary drive shaft 32 also drives an upper drive shaft 38 in the housing 22 which parallels the lower drive shaft 34 and is also supported by suitable bearing structures 40. The drive connection between the primary drive shaft 32 and the upper drive shaft 38 is preferably a sprocket chain and sprocket gear arrangement 42 while the output shaft 30, primary drive shaft 32 and lower drive shaft 34 are drivingly connected by a sprocket chain 31 and gears, so that the lower drive shaft 34 and upper drive shaft 38 are driven in opposite directions as shown in FIG. 4.

The shaft 34 has a lower pressure roller 44 mounted thereon in which the periphery extends through an enlarged opening 46 in the support surface 12. A second lower pressure roller 48 is mounted in spaced and aligned relation to the roller 44 in the same relation to the support surface 12 with the roller 48 being rotatably supported by a stub shaft 50 or the like. The lower pressure rollers 44 and 48 are drivingly interconnected by a sprocket chain 52 interconnecting sprocket gears 54 mounted on the shaft 34 and shaft 50 respectively so that two lower pressure rollers 44 and 48 are driven in the same direction and at the same speed. A pair of upper pressure rollers 56 and 58 are mounted in the lower end of the end portion 26 of the housing 22 and are rotatably supported by stub shafts 60 and 62 each of which has a sprocket gear 64 and 66 thereon with the sprocket gears being driven by a sprocket chain 68 engaged with a sprocket gear 70 on the upper drive shaft 38.

Figure 5:
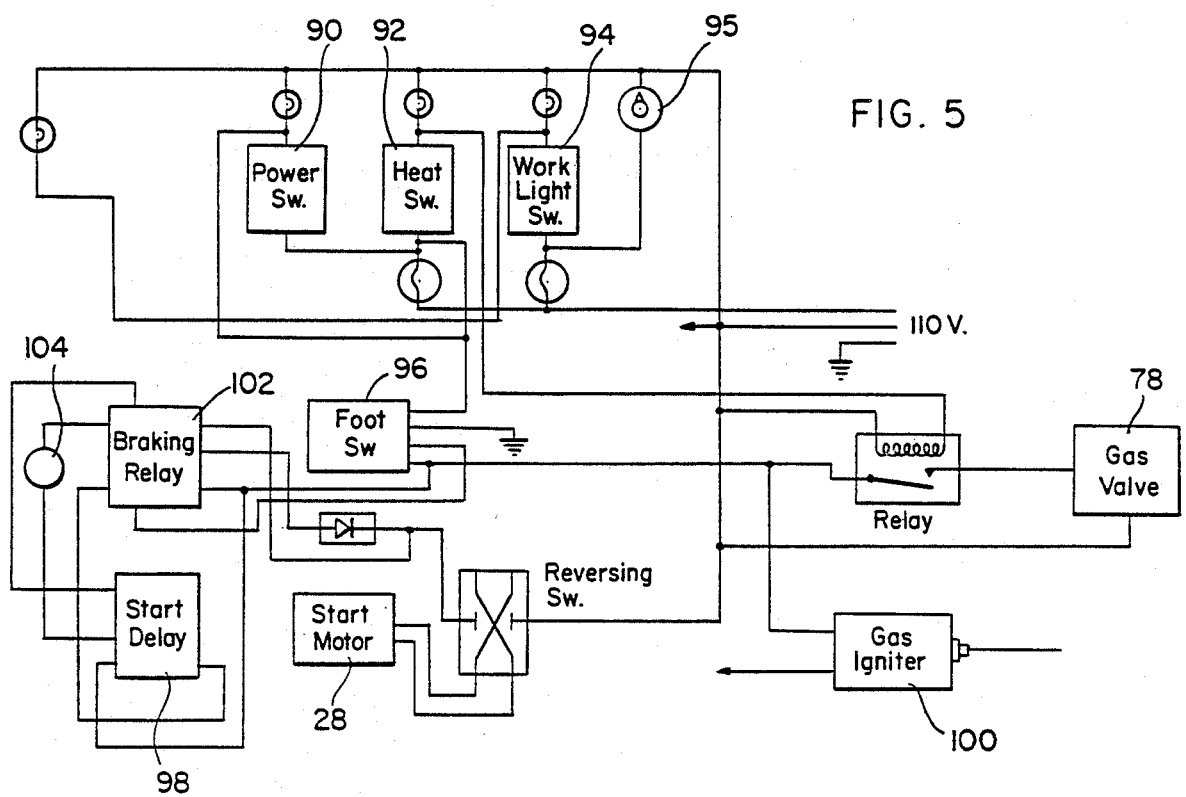
FIG. 5 is a diagrammatic view illustrating the control arrangement and heating arrangement for the plastic film seaming apparatus.

A gas supply line 72 extends into the housing 22 and is provided with a shut-off valve 74 and a pressure regulator 76 located in the housing 22. The gas line 72 includes a pedal-operated, solenoid controlled valve 78 downstream from the regulator and upstream from a control panel 80 in the housing 22 which includes a manual gas control valve 82 to adjust the flow rate of gas. The gas line 72 extends to a gas and air mixing device 84 with the mixed air and gas then being supplied to a gas burner 86 having discharge jets or nozzles 88 directed toward the area between the upper and lower pressure rollers 44 and 56 which are the welding or seaming rollers. A gas igniter is also associated with the burner 86 which will be operated when the pedal-operated valve 78 is operated to ignite the combustible mixture. The control panel 80 is also provided with a power switch 90 and a heat switch 92 as well as a work light switch 94 and hour meter 95 which are schematically illustrated. When the machine is connected to a suitable source of electrical energy, actuation of the power switch 90 provides electrical energy to the entire apparatus and to the drive motor 28 through a foot-operated control switch 96. When the heat switch 92 is operated, the solenoid gas valve 78 will open when the foot switch 96 is depressed. When the foot switch 96 is depressed, it supplies power to the drive motor 28 through an adjustable delay relay 98 as well as open the gas valve 78 and also turns on the gas igniter 100 illustrated schematically in FIG. 5. With the delay relay 98 on the drive motor, the gas flame is permitted to be established before the drive assembly is put in motion to insure a uniform seal or seam from the very start of the operation. The motor is also provided with a braking relay 102 which applies a stopping force to the motor and drive assembly to avoid any coasting action when the foot switch 96 is released. Also, a speed control 104 is provided to control the speed of the welding rollers 56 and 44 and the clutch or grip rollers 58 and 48 with a reversing switch 106 in the form of a toggle switch being included to reverse the motor in the event film becomes jammed.

By utilizing a gas flame, a higher temperature can be obtained as compared with the use of electrical heating devices which will allow the surface of the material being sealed or seamed to be heated to a sealing temperature with less heat penetration into the interior of the material thereby reducing distortion of the material. Also, the higher temperatures produced by the gas flame enable greater welding or sealing speeds to be achieved and also allows the sealing of plastic materials that are not possible when using other types of heating devices. As illustrated, the gas burner 86 includes a guide tube 87 which underlies the upper film so that the flame heats the facing surfaces of the upper and lower films as they enter between the welding rollers.

The use of the gas burner and igniter provides an instant on and off operation with no warm-up or cool-down cycles as required when using an electrically heated device thereby increasing the efficiency of the unit by using heat energy only during the actual sealing operation. This also reduces the heat load discharged into the ambient atmosphere thereby reducing the load on an airconditioning system or the like for the work place with most of the BTUs from the gas flame going directly into the process of melting the plastic to be sealed.

The open gas flame also utilizes oxygen in the area surrounding the burner thereby creating an inert atmosphere to some degree thereby prohibiting or reducing the tendency of the material being seamed to burn which would produce an undesirable smoke and possibly hazard gases. Any oxygen available in the area of the flame will be consumed by the gas which has a lower combustion temperature than the material being sealed so that ambient oxygen will be consumed by the gas rather than supporting combustion of the material being sealed or seamed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A gas fired plastic film seaming apparatus for sealingly connecting overlapped edges of plastic film comprising a supporting structure including a supporting surface, a rotatably driven lower pressure roller mounted with its upper periphery generally in alignment with the supporting surface, a driven upper pressure roller supported above the surface in opposed relation to the lower roller for receiving overlapping plastic film therebetween, a gas burner directing a gas flame toward adjacent peripheral portions of the pressure rollers on the approach side of the rollers for heating plastic film, means supplying a combustible mixture of gas and air to said burner thereby eliminating dependency on ambient air surrounding the burner to support combustion and providing a stable and controllable flame, and driven lower and upper rollers spaced laterally of the pressure rollers and receiving the joined overlapping edges of the plastic film to move the plastic film away from the pressure rollers with all of the rollers being driven at the same rotational speed, all of said rollers being powered from an electric drive motor, a foot switch for operating said electric motor, said means supplying a combustible mixture of gas and air including a gas valve in a supply line controlled by the foot switch for supplying a combustible mixture to the gas burner, a gas igniter associated with said burner, said gas igniter also being actuated by said foot switch, a delay device associated with the foot switch and electric drive motor to delay operation of the motor until the gas igniter and gas valve have been actuated to initiate a gas flame thereby assuring that the film will be sealingly connected from the starting point of the motor.

2. The structure as defined in claim 1 together with a braking relay for the motor to prevent coasting action when the foot switch is no longer actuated.

3. The structure as defined in claim 1 wherein said upper rollers are positioned in a housing spaced above the supporting surface with the periphery of the upper rollers being closely spaced in relation to the periphery of the lower rollers, an upper drive shaft in said housing disposed above the upper rollers and being drivingly connected thereto by said sprocket chain and sprocket gears, a drive motor drivingly connected to the upper drive shaft, the lower rollers being drivingly connected to a lower drive shaft drivingly connected to the drive motor with the upper drive shaft being driven in an opposite rotational direction as compared with the lower drive shaft for driving the upper rollers and lower rollers in opposite directions for moving plastic film sheets therebetween.

4. The structure as defined in claim 1 wherein said foot switch terminates operation of the gas igniter and closes the gas valve when the electric drive motor is deactivated and control means to control the speed of the rollers and braking means associated with the motor to prevent the drive motor from coasting after the foot switch deactivates the motor.

5. The structure as defined in claim 4 wherein the association of the foot switch, electric motor, gas valve and gas igniter provides an instant on and off operation with ignition of the combustible mixture providing instant sealing temperature without warm-up or cool-down such as required when using electrically heated devices with the instant on and instant off reducing heat load discharged into the ambient atmosphere, the combustible air and gas mixture being operable in conditions in which ambient surrounding area to the burner is inert and does not include oxygen to support combustion.

6. The structure as defined in claim 5 wherein said upper rollers are positioned in a housing spaced above the supporting surface with the periphery of the upper rollers being closely spaced in relation to the periphery of the lower rollers, an upper drive shaft in said housing disposed above the upper rollers and being drivingly connected thereto by a sprocket chain and sprocket gears, said drive motor drivingly connected to the upper drive shaft, the lower rollers being drivingly connected to a lower drive shaft drivingly connected to the drive motor with the upper drive shaft being driven in an opposite rotational direction as compared to the lower drive shaft for driving the upper rollers and lower rollers in opposite directions for moving plastic film sheets therebetween.

* * * * *